United States Patent
Despax et al.

(10) Patent No.: US 12,466,972 B2
(45) Date of Patent: Nov. 11, 2025

(54) COATING COMPOSITION FREE OF TITANIUM DIOXIDE

(71) Applicant: SOCIETE D'EXPLOITATION DE PRODUITS POUR LES INDUSTRIES CHIMIQUES SEPPIC, Paris (FR)

(72) Inventors: Stéphanie Despax, Paris (FR); Sophie Faget, Paris (FR)

(73) Assignee: SOCIETE D'EXPLOITATION DE PRODUITS POUR LES INDUSTRIES CHIMIQUES SEPPIC, Paris (FR)

( * ) Notice: Subject to any disclaimer, the term of this patent is extended or adjusted under 35 U.S.C. 154(b) by 626 days.

(21) Appl. No.: 16/626,764

(22) PCT Filed: Jul. 12, 2018

(86) PCT No.: PCT/FR2018/051756
§ 371 (c)(1),
(2) Date: Dec. 26, 2019

(87) PCT Pub. No.: WO2019/020892
PCT Pub. Date: Jan. 31, 2019

(65) Prior Publication Data
US 2020/0140714 A1 May 7, 2020

(30) Foreign Application Priority Data
Jul. 27, 2017 (FR) ........................... 1757164

(51) Int. Cl.
| | | |
|---|---|---|
| *C09D 101/02* | (2006.01) | |
| *C09D 5/02* | (2006.01) | |
| *C09D 5/03* | (2006.01) | |
| *C09D 101/08* | (2006.01) | |
| *C08K 3/08* | (2006.01) | |
| *C08K 5/00* | (2006.01) | |
| *C08K 5/053* | (2006.01) | |
| *C08K 5/098* | (2006.01) | |
| *C08K 5/10* | (2006.01) | |

(52) U.S. Cl.
CPC .......... *C09D 101/02* (2013.01); *C09D 5/024* (2013.01); *C09D 5/033* (2013.01); *C09D 101/08* (2013.01); *C08K 3/08* (2013.01); *C08K 2003/0818* (2013.01); *C08K 5/0016* (2013.01); *C08K 5/053* (2013.01); *C08K 5/098* (2013.01); *C08K 5/10* (2013.01); *C08K 2201/003* (2013.01); *C08K 2201/019* (2013.01)

(58) Field of Classification Search
None
See application file for complete search history.

(56) References Cited

U.S. PATENT DOCUMENTS

| 3,396,129 | A | * | 8/1968 | Yeadon | C08G 18/686 |
| | | | | | 528/53 |
| 4,665,648 | A | | 5/1987 | Branco et al. | |
| 5,123,962 | A | * | 6/1992 | Komuro | D21C 5/00 |
| | | | | | 106/164.01 |
| 5,169,642 | A | | 12/1992 | Brinker et al. | |
| 5,393,333 | A | | 2/1995 | Trouve | |
| 5,859,060 | A | * | 1/1999 | Platt | A61K 31/137 |
| | | | | | 514/569 |
| 6,468,561 | B1 | | 10/2002 | Grillo et al. | |
| 7,510,729 | B2 | * | 3/2009 | Kolter | A61K 9/5047 |
| | | | | | 424/490 |
| 2004/0018235 | A1 | | 1/2004 | Tanizawa et al. | |
| 2004/0096503 | A1 | * | 5/2004 | Gayser, Jr. | A61K 9/286 |
| | | | | | 424/471 |

(Continued)

FOREIGN PATENT DOCUMENTS

| CN | 105007747 A | 10/2015 |
| EP | 2 601 936 A1 | 6/2013 |

(Continued)

OTHER PUBLICATIONS

JP-5162141-B2—English translation (Year: 2007).*
WO-2011001058-A1, English translation (Year: 2011).*
Sakata et al. "A Novel White Film for Pharmaceutical Coating Formed by Interaction of Calcium Lactate Pentahydrate With Hydroxypropyl Methylcellulose," International Journal of Pharmaceutics, vol. 317, 2006, pp. 120-126.
International Search Report and Written Opinion, dated Sep. 12, 2018, from corresponding/related International Application No. PCT/FR2018/051756.
Bowen, "Particle Size Distribution Measurement from Millimeters to Nanometers and from Rods to Platelets," Journal of Dispersion Science and Technology, vol. 23, No. 5, pp. 631-662, 2002.
Pharmaeuticals, Kirk-Othmer encyclopedia, 3rd edition, vol. 17, pp. 281-282.

(Continued)

*Primary Examiner* — Stefanie J Cohen
(74) *Attorney, Agent, or Firm* — NIXON & VANDERHYE

(57) ABSTRACT

Disclosed is a coating composition including, in relation to 100% of the weight thereof: 10-90 wt. % of at least one film-forming polymer selected from methyl cellulose, hydroxy propyl methyl cellulose, hydroxy propyl cellulose, hydroxy ethyl cellulose, sodium carboxy methyl cellulose, ethyl cellulose, PVA (polyvinyl alcohols), PVA-PEG (polyethylene glycol) copolymers, polyvinyl acetate, polyvinyl pyrrolidones (PVP), vinylpyrrolidone-vinyl acetate copolymers, alginates, pectin, arabic gum, guar gum, carrageenans, xanthan gum, inulin, chitosan, methacrylic acid copolymer, ethyl acetate, or polyethylene glycol-polypropylene glycol (PEG-PPG) copolymer; 0-50 wt. % of at least one auxiliary coating agent selected from diluents, surfactants, plasticisers and anti-foaming agents; and 10-50 wt. % of a whitening filler free of titanium dioxide including at least one alkaline or alkaline earth salt of a fatty acid and at least one cellulose compound selected from cellulose, cellulose powder, microcrystalline cellulose, or a mixture of the components.

12 Claims, No Drawings

(56) References Cited

U.S. PATENT DOCUMENTS

| | | | |
|---|---|---|---|
| 2004/0198838 A1* | 10/2004 | Alles | A61K 31/135 514/651 |
| 2005/0042277 A1* | 2/2005 | Srinivas | A61K 9/2886 424/452 |
| 2006/0024353 A1* | 2/2006 | Trouve | C08J 3/12 424/440 |
| 2008/0300233 A1* | 12/2008 | Kroselj | A61K 9/2054 514/210.02 |
| 2010/0316713 A1* | 12/2010 | Kochhar | A61P 3/10 514/252.17 |
| 2011/0136772 A1* | 6/2011 | Clark | A61K 9/2054 514/178 |

FOREIGN PATENT DOCUMENTS

| | | | | |
|---|---|---|---|---|
| FR | 2 548 675 A1 | 1/1985 | | |
| FR | 2 660 317 A1 | 10/1991 | | |
| JP | 5162141 B2 * | 3/2013 | | |
| WO | 86/04817 A1 | 8/1986 | | |
| WO | WO-2011001058 A1 * | 1/2011 | | A61K 31/196 |
| WO | 2012/018056 A1 | 2/2012 | | |

OTHER PUBLICATIONS

Inra et al., "Food additive E171: the first results of the exhibition oral with titanium dioxide nanoparticles," INRA Science & Impact, Jan. 20, 2017, 4 pages.

Bettini et al., "Food-grade $TiO_2$ impairs intestinal and systemic immune homeostasis, initiates preneoplastic lesions and promotes aberrant crypt development in the rat colon," www.nature.com/scientificreports, Jan. 20, 2017, pp. 1-13.

Office Action issued in Japanese Patent Application No. 2020-503877 dated Aug. 2, 2022.

* cited by examiner

COATING COMPOSITION FREE OF TITANIUM DIOXIDE

BACKGROUND OF THE INVENTION

Field of the Invention

A subject matter of the present invention is a composition comprising at least one alkali metal or alkaline earth metal fatty acid salt and a cellulosic compound (preferably cellulose); the use of this composition to confer "whitening" properties on a film-forming composition intended for the coating of ingestible solid forms, more particularly intended for the coloring of dry forms in the pharmaceutical industry, the preparation of food supplements and/or of foods and the veterinary field (hard gelatin capsules, tablets, pellets, and the like).

The invention also relates to the coating processes employing said coating compositions and to the colored coated products obtained by the implementation of the coating processes comprising the use of said coating compositions.

These compositions exhibit the distinctive feature of being devoid of titanium dioxide, a compound which is very widely used in these industrial fields, while retaining properties of covering and of white coloring of dry forms, properties characteristic of titanium dioxide.

Description of the Related Art

The dry forms used in the industries of human or veterinary pharmaceuticals, and of food supplements, are generally provided in the form of tablets, hard gelatin capsules, sugar-coated tablets, granules, which are made by agglomeration of solid particles comprising at least one active principle and/or at least one nutritional ingredient and at least one excipient. These dry forms can be prepared by the implementation of many techniques known to a person skilled in the art, such as, for example, compression, pelletization, granulation, compacting or extrusion techniques.

In order to protect these dry forms from the degradation generated by external conditions, such as, for example, the degradation of the active principles included in them by light radiation or by atmospheric humidity, or else from abrasion during their packaging, or else from the formation of dust, and/or in order to improve the external appearance of said dry forms, by conferring a specific color or an improved gloss on them, said dry forms are covered with a film of a chemical composition acting as a coating agent.

Coating compositions are well known to a person skilled in the art and generally consist of at least one film-forming agent and of a coloring system, consisting of pigments of inorganic origin, such as, for example, iron oxides, or of dyes.

Titanium dioxide ($TiO_2$) is used in many applications (food additives—European identification E171, cosmetics, pigments) for its ultraviolet absorption properties and its performance qualities as a white dye.

Among recent documents published on the use of this additive, a study conducted by the French National Institute for Agricultural Research (INRA—France), published on Jan. 20, 2017, shows that "chronic exposure of rats to titanium dioxide (E 171 additive, partially nanometric) orally can lead to pre-cancerous colorectal lesions." Although the results of this investigation did not make it possible to conclude on the harmful effects of $TiO_2$ on humans, the matter was referred to ANSES (the French National Agency for Food, Environmental and Occupational Health and Safety) by the French Ministries of Consumer Affairs, Health and Food in order precisely to study the results obtained by INRA.

The aim of ANSES was to determine if this study was "likely to call into question the conclusions of the EFSA (European Food Safety Authority) concerning the re-evaluation of E171 published in September 2016", namely that "the available data on titanium dioxide (E171) in foods did not indicate a problem for the health of consumers", while recommending that additional studies be carried out.

In its opinion published in April 2017, ANSES states that: "while the results presented in the INRA publication do not make it possible, at this stage, to call into question the evaluation of E171 conducted by EFSA, it reveals effects which had not previously been identified, in particular potential promoting effects on carcinogenesis".

The Agency thus itself also calls for additional studies in order "on the one hand to give a verdict on the effects observed and, on the other hand, to establish an admissible daily intake for E171".

Moreover, various press articles which have recently appeared on the controversial use of this additive, in particular in food supplements, as well as the fears expressed by consumers, a significant movement calling into question the use of the additive E171 is observed and is causing industrialists using this ingredient, and more particularly the manufacturers and suppliers of coating compositions for dry solid forms (hard gelatin capsules, tablets, pellets, and the like) for the pharmaceutical and veterinary industries, as well as for the industries for the preparation of food supplements and/or of foods, to look for an alternative replacement solution.

The dry solid forms can be colored by incorporating a colorant in the form of a powder directly in the formulation. However, the commonest technique remains the film coating of the dry solid form.

Film coating processes consist in depositing a fine layer of a composition comprising at least one film-forming polymer and at least one coloring agent at the surface of a solid support. In order to obtain a white coloring at the surface of this solid support, the use of titanium dioxide is, to date, an inescapable element. It makes it possible to obtain a pure white color, stable after exposure to light, and exhibits a covering power, an opacifying power, which is very high.

It has been possible to test various ingredients previously in order to replace the ingredient E171 in whitening solutions, in particular for applications intended to prepare sugar-coated tablets, such as, for example, Calcium Carbonate (E170), starches (from rice, pregelatinized, and the like); these solutions do not satisfy a person skilled in the art because certain limits may appear, such as restrictive uses in non-acidic applications, whitening and coverage capabilities significantly below the performance qualities of titanium dioxide, and instability of performance qualities over time.

In particular, the PCE, "Polymer Comply Europe", published a document in 2016 entitled "Analysis of Alternatives for Titanium dioxide as Colourant Additive in Plastic Industry" which summarizes the different possible alternatives to titanium dioxide: calcium carbonate, zinc oxide, kaolin, talc, and the like. Alternative products were evaluated against $TiO_2$ with regard to different criteria, such as whiteness, opacifying power, color stability, and the like. The document clearly shows that the performance quality of the alternative products has fallen in comparison with titanium dioxide, in particular in terms of whiteness and of covering power. Yukoh Sakata, Sumihiro Shiraishi and Makoto Otsuka [A Novel White Film for Pharmaceutical Coating Formed by Interaction of Calcium Lactate Pentahydrate With Hydroxypropyl Methylcellulose, Y Sakata et al., Int. J. Pharm., 317 (2), 120-126, 2006 Mar. 16] studied another solution in 2006: the use of calcium lactate pentahydrate as a whitening agent for pharmaceutical film-coating products. However, it is necessary to incorporate significant amounts of PEG 6000 in the film so that the film does not crack on the tablets.

SUMMARY OF THE INVENTION

The inventors of the present invention have therefore sought to develop compositions intended to coat dry forms which confer a white coloring and an opacifying and light-stable appearance while not containing titanium dioxide. According to a first aspect, a subject matter of the invention is a coating composition comprising, per 100% of its weight:
  from 10% to 90% by weight, in particular from 20% to 90% and more particularly still from 30% to 90% by weight of at least one film-forming polymer of at least one film-forming polymer chosen from cellulose polymers or derivatives of cellulose polymers, vinyl alcohol derivatives, vinylpyrrolidone derivatives, polymers of natural origin, acrylic or methacrylic derivatives, glycol or propylene glycol derivatives or the combinations of these two substances, or copolymers of vinyl alcohol and of polyethylene glycol (PEG),
  from 0% to 50% by weight of at least one auxiliary coating agent chosen from diluents, surfactants, plasticizers or antifoaming agents, and
  from 10% to 50% by weight of a whitening filler devoid of titanium dioxide comprising at least one alkali metal or alkaline earth metal fatty acid salt and at least one cellulose compound.

This invention describes a composition of film-coating products which unexpectedly makes it possible to obtain a white, opacifying and light-stable coloring, after deposition at the surface of a dry form, while not containing titanium dioxide.

To obtain these properties is made possible in particular by the specific choice of a combination of ingredients constituting what may be called the "whitening filler", in combination with at least one film-forming polymer and optionally at least one film-coating aid.

These film-coating products are provided in the form of mixtures of powders or of granules. They are intended for the coating of dry forms in the pharmaceutical industry, the preparation of food supplements and/or of foods and the veterinary field (hard gelatin capsules, tablets, pellets, and the like).

This is why, according to a specific aspect, a subject matter of the invention is a composition as defined above, characterized in that said at least one film-forming polymer is chosen from methylcellulose, hydroxypropyl methylcellulose, hydroxypropyl cellulose, hydroxyethyl cellulose, carboxymethylcellulose sodium, ethylcellulose, PVA (polyvinyl alcohols), PVA/PEG (polyethylene glycol) copolymers, polyvinyl acetate, polyvinylpyrrolidones (PVP), vinylpyrrolidone/vinyl acetate copolymers, starches, starches modified with maltodextrins, alginates, pectin, gum arabic, guar gum, carrageenans, xanthan gum, inulin, chitosan, methacrylic acid/ethyl acetate copolymer or polyethylene glycol/polypropylene glycol (PEG/PPG) copolymer.

According to a specific aspect, a subject matter of the invention is a composition as defined above, characterized in that said at least one film-forming polymer is chosen from methylcellulose, hydroxypropyl methylcellulose, hydroxypropyl cellulose, hydroxyethyl cellulose, carboxymethylcellulose sodium, ethylcellulose, PVA (polyvinyl alcohols), PVA/PEG (polyethylene glycol) copolymers, polyvinyl acetate, polyvinylpyrrolidones (PVP), vinylpyrrolidone/vinyl acetate copolymers, starches, starches modified with maltodextrins, alginates, pectin, gum arabic, guar gum, carrageenans, xanthan gum, inulin, chitosan, methacrylic acid/ethyl acetate copolymer or polyethylene glycol/polypropylene glycol (PEG/PPG) copolymer.

Mention may be made, among the sorbitan esters which can be combined with the coating composition which is a subject matter of the present invention, of:
  sorbitan monolaurate, sold by SEPPIC under the brand name Montane™ 20, by Croda under the brand name Span™ 20 and by,
  sorbitan monopalmitate, sold by SEPPIC under the brand name Montane™ 40 and by Croda under the brand name Span™ 40,
  sorbitan monostearate, sold by SEPPIC under the brand name Montane™ 60 and by Croda under the brand name Span™ 60,
  sorbitan monooleate, sold by SEPPIC under the brand name Montane™ 80 and by Croda under the brand name Span™ 80,
  sorbitan trioleate, sold by SEPPIC under the brand name Montane™ 85 and by Croda under the brand name Span™ 85,
  sorbitan sesquioleate, sold by SEPPIC under the brand name Montane™ 83, by Croda under the brand name Crill™ 43 and by,
  sorbitan tristearate, sold by SEPPIC under the brand name Montane™ 65 and by Croda under the brand name Span™ 65,
  sorbitan monoisostearate, sold by SEPPIC under the brand name Montane™ 70 and by Croda under the brand name Crill™ 6, Mention may be made, among the ethoxylated sorbitan esters which can be combined with the coating composition which is a subject matter of the present invention, of:
  sorbitan monolaurate ethoxylated with 20 moles of ethylene oxide, sold by SEPPIC under the brand name Montanox™ 20 and by Croda under the brand name Tween™ 20,
  sorbitan monolaurate ethoxylated with 4 moles of ethylene oxide, sold under the brand name Tween™ 21,
  sorbitan monolaurate ethoxylated with 6 moles of ethylene oxide, sold under the brand name Nikkol™ GL-I by Nikko,
  sorbitan monopalmitate ethoxylated with 20 moles of ethylene oxide, sold by SEPPIC under the brand name Montanox™ 40 and by Croda under the brand name Tween™ 40,
  sorbitan monostearate ethoxylated with 20 moles of ethylene oxide, sold by SEPPIC under the brand name Montanox™ 60 and by Croda under the brand name Tween™ 60,
  sorbitan tristearate ethoxylated with 20 moles of ethylene oxide, sold by SEPPIC under the brand name Montanox™ 65 and by Croda under the brand name Tween™ 65,
  sorbitan monooleate ethoxylated with 20 moles of ethylene oxide, sold by SEPPIC under the brand name Montanox™ 80 and by Croda under the brand name Tween™ 80, sorbitan trioleate ethoxylated with 20 moles of ethylene oxide, sold by SEPPIC under the brand name Montanox™ 85 and by Croda under the brand name Tween™ 85, sorbitan monoisostearate ethoxylated with 20 moles of ethylene oxide, sold by SEPPIC under the brand name Montanox™ 70 and by Croda under the brand name Tween™ 120, sorbitan monostearate ethoxylated with 4 moles of ethylene oxide, sold by Croda under the brand name Tween™ 61, sorbitan monooleate ethoxylated with 5 moles of ethylene oxide, sold by SEPPIC under the brand name Montanox™ 81 and by Croda under the brand name Tween™ 81.

Mention may be made, among the ethoxylated fatty alcohols which can be combined with the coating composition which is a subject matter of the present invention as surfactants, of oleyl alcohol ethoxylated with 2 moles of ethylene oxide, oleyl alcohol ethoxylated with 3 moles of ethylene oxide, oleyl alcohol ethoxylated with 5 moles of ethylene oxide, oleyl alcohol ethoxylated with 10 moles of ethylene oxide, oleyl alcohol ethoxylated with 20 moles of ethylene oxide, lauryl alcohol ethoxylated with 4 moles of ethylene oxide, lauryl alcohol ethoxylated with 7 moles of ethylene oxide, lauryl alcohol ethoxylated with 9 moles of ethylene oxide, lauryl alcohol ethoxylated with 23 moles of ethylene oxide, cetyl alcohol ethoxylated with 2 moles of ethylene oxide, cetyl alcohol ethoxylated with 10 moles of ethylene oxide, cetyl alcohol ethoxylated with 20 moles of ethylene oxide, stearyl alcohol ethoxylated with 2 moles of ethylene oxide, stearyl alcohol ethoxylated with 10 moles of ethylene oxide, stearyl alcohol ethoxylated with 20 moles of ethylene oxide or stearyl alcohol ethoxylated with 100 moles of ethylene oxide.

Mention may be made, among the ethoxylated fatty acids which can be combined with the coating composition which is a subject matter of the present invention as surfactants, of monolauric acid ethoxylated with between 4 and 200 moles of ethylene oxide, and more particularly monolauric acid ethoxylated with 4 moles of ethylene oxide, monolauric acid ethoxylated with 6 moles of ethylene oxide, monolauric acid ethoxylated with 7 moles of ethylene oxide, monolauric acid ethoxylated with 8 moles of ethylene oxide, monolauric acid ethoxylated with 10 moles of ethylene oxide, monolauric acid ethoxylated with 50 moles of ethylene oxide, monolauric acid ethoxylated with 100 moles of ethylene oxide or monolauric acid ethoxylated with 200 moles of ethylene oxide, monooleic acid ethoxylated with between 4 and 200 moles of ethylene oxide, and more particularly monooleic acid ethoxylated with 1 mole of ethylene oxide, monooleic acid ethoxylated with 2 moles of ethylene oxide, monooleic acid ethoxylated with 4 moles of ethylene oxide, monooleic acid ethoxylated with 5 moles of ethylene oxide, monoolic acid ethoxylated with 6 moles of ethylene oxide, monooleic acid ethoxylated with 8 moles of ethylene oxide, monooleic acid ethoxylated with 9 moles of ethylene oxide, monooleic acid ethoxylated with 10 moles of ethylene oxide, monooleic acid ethoxylated with 50 moles of ethylene oxide, monooleic acid ethoxylated with 100 moles of ethylene oxide or monooleic acid ethoxylated with 200 moles of ethylene oxide, monostearic acid ethoxylated with between 4 and 200 moles of ethylene oxide, and more particularly monostearic acid ethoxylated with 1 mole of ethylene oxide, monostearic acid ethoxylated with 2 moles of ethylene oxide, monostearic acid ethoxylated with 4 moles of ethylene oxide, monostearic acid ethoxylated with 5 moles of ethylene oxide, monostearic acid ethoxylated with 6 moles of ethylene oxide, monostearic acid ethoxylated with 8 moles of ethylene oxide, monostearic acid ethoxylated with 9 moles of ethylene oxide, monostearic acid ethoxylated with 10 moles of ethylene oxide, monostearic acid ethoxylated with 50 moles of ethylene oxide, monostearic acid ethoxylated with 100 moles of ethylene oxide, monostearic acid ethoxylated with 200 moles of ethylene oxide, monostearic acid ethoxylated with 300 moles of ethylene oxide or monostearic acid ethoxylated with 1000 moles of ethylene oxide.

Mention may be made, among the hydrogenated and ethoxylated castor oils which can be combined with the coating composition which is a subject matter of the present invention as surfactants, of hydrogenated castor oil ethoxylated with 5 moles of ethylene oxide, hydrogenated castor oil ethoxylated with 7 moles of ethylene oxide, hydrogenated castor oil ethoxylated with 10 moles of ethylene oxide, hydrogenated castor oil ethoxylated with 20 moles of ethylene oxide, hydrogenated castor oil ethoxylated with 25 moles of ethylene oxide, hydrogenated castor oil ethoxylated with 30 moles of ethylene oxide, hydrogenated castor oil ethoxylated with 40 moles of ethylene oxide, hydrogenated castor oil ethoxylated with 45 moles of ethylene oxide, hydrogenated castor oil ethoxylated with 50 moles of ethylene oxide, hydrogenated castor oil ethoxylated with 60 moles of ethylene oxide, hydrogenated castor oil ethoxylated with 80 moles of ethylene oxide or hydrogenated castor oil ethoxylated with 100 moles of ethylene oxide.

Mention may be made, among the plasticizers which can be used for the preparation of the composition which is a subject matter of the present invention, of glycerol, polypropylene glycols, polyethylene glycols or their condensation derivatives with a fatty acid or a fatty alcohol, stearic acid and its derivatives, acetylated monoglycerides, esters of citric acid, such as, for example, triethyl citrate, triethyl acetylcitrate or tributyl acetylcitrate, triacetin, sorbitol or dibutyl seccate.

According to another specific aspect, a subject matter of the invention is a composition as defined above, characterized in that said at least one auxiliary coating agent is chosen from diluents, such as lactose, sucrose, mannitol, sorbitol, xylose, xylitol, isomalt, talc, native starches or stearic acid; surfactants, such as sorbitan esters, ethoxylated sorbitan esters, hydrogenated and ethoxylated castor oils, lecithins, sodium lauryl sulfate, ethoxylated fatty alcohols or ethoxylated fatty acids; plasticizers, such as glycerol, polypropylene glycols, polyethylene glycols or their condensation derivatives with a fatty acid or a fatty alcohol, stearic acid and its derivatives or acetylated monoglycerides; or antifoaming agents, such as fatty acids or silicone derivatives.

Mention may more particularly be made, among the diluents which can be combined with the composition which is a subject matter of the present invention, of stearic acid, which contributes to conferring protection from moisture.

According to another specific aspect, a subject matter of the invention is a composition as defined above, characterized in that said at least one film-forming polymer is hydroxypropyl methylcellulose.

According to another specific aspect, a subject matter of the invention is a composition as defined above, characterized in that the whitening filler is composed, for 100% of its weight, of 20% to 80% by weight of alkali metal or alkaline earth metal fatty acid salt and of 20% to 80% by weight of a cellulose compound.

Preferably, the whitening filler is composed, for 100% of its weight, of 25% to 75%, more particularly of 30% to 70%, by weight of alkali metal or alkaline earth metal fatty acid salt and of 25% to 75%, more particularly of 30% to 70%, by weight of a cellulose compound.

Within the meaning of the present invention, the term "alkali metal fatty acid salt" is understood to mean a compound of formula (I):

$$R_1-COO^-X^+ \quad (I)$$

with $R_1$ representing a saturated or unsaturated and linear or branched aliphatic radical optionally comprising a hydroxyl functional group and comprising from twelve to twenty-two carbon atoms, more particularly a saturated or unsaturated linear aliphatic radical comprising from twelve to twenty-two carbon atoms and more particularly still a radical chosen from the elements of the group consisting of the dodecyl, tetradecyl, hexadecyl, octadecyl, oleyl, linoleyl, linolenyl, arachidyl and behenyl radicals;

with $X^+$ representing an element of the group consisting of the sodium cation, the potassium cation and the lithium cation.

Within the meaning of the present invention, the term "alkaline earth metal fatty acid salt" is understood to mean a compound of formula (II):

$$(R_1-COO^-)Y^{2+}(R'_1-COO^-) \quad (II)$$

with $R_1$ and $R'_1$, which are identical or different and more particularly identical, representing a saturated or unsaturated and linear or branched aliphatic radical optionally comprising a hydroxyl functional group and comprising from twelve to twenty-two carbon atoms, more particularly a saturated or unsaturated linear aliphatic radical comprising from twelve to twenty-two carbon atoms and more particularly still a radical chosen from the elements of the group consisting of the dodecyl, tetradecyl, hexadecyl, octadecyl, oleyl, linoleyl, linolenyl, arachidyl and behenyl radicals;

with $Y^+$ representing an element of the group consisting of the magnesium cation, the calcium cation, the beryllium cation and the strontium cation.

According to a specific aspect, the alkali metal or alkaline earth metal fatty acid salt is chosen from the elements of the group consisting of magnesium stearate, calcium stearate, sodium stearate, potassium stearate, magnesium oleate, calcium oleate, sodium oleate, potassium oleate, magnesium palmitate, calcium palmitate, sodium palmitate and potassium palmitate.

According to a more specific aspect, the alkali metal or alkaline earth metal fatty acid salt is chosen from the monovalent salts of fatty acids and alkali metal cations and/or the divalent salts of fatty acids and alkaline earth metal cations, such as the calcium or magnesium cations.

According to a specific aspect, the alkali metal or alkaline earth metal fatty acid salt is chosen from the elements of the group consisting of magnesium stearate, calcium stearate, magnesium oleate, calcium oleate, magnesium palmitate and calcium palmitate, and more particularly still the alkali metal or alkaline earth metal fatty acid salt is magnesium stearate.

According to another specific aspect, a subject matter of the present invention is a coating composition as defined above, characterized in that the alkali metal or alkaline earth metal fatty acid salt is chosen from the monovalent salts of fatty acids and alkali metal cations and/or the divalent salts of fatty acids and alkaline earth metal or other metal cations, such as calcium or magnesium cations.

According to another specific aspect, a subject matter of the present invention is a coating composition as defined above, characterized in that the alkali metal or alkaline earth metal fatty acid salt is magnesium stearate.

According to another specific aspect, a subject matter of the present invention is a coating composition as defined above, characterized in that said at least one cellulose compound is chosen from cellulose, cellulose powder, microcrystalline cellulose or a mixture of these components.

According to another specific aspect, a subject matter of the present invention is a coating composition as defined above, characterized in that at least 90% by volume of the particles of said at least one cellulose compound have a diameter of less than or equal to 60 micrometers.

According to another specific aspect, a subject matter of the present invention is a coating composition as defined above, characterized in that it is provided in the form of an aqueous dispersion, of a powder or of ready-for-use granules.

According to another specific aspect, a subject matter of the present invention is a process for the preparation of the coating composition as defined above and which is provided in the form of a dry powder, comprising the following stages:
 a stage (a) of mixing the film-forming polymer, the whitening filler according to the invention and, if necessary or if desired, one or more other coating auxiliaries,
 an optional stage (b) of grinding the mixture resulting from stage (a), in order to form said coating composition.

According to another specific aspect, a subject matter of the present invention is a process for the preparation of the coating composition as defined above and which is provided in the form of ready-for-use granules, comprising the following stages:
 a stage (a1) of wetting the mixture of film-forming polymer, of the whitening filler according to the invention and, if necessary or if desired, of one or more other coating auxiliaries with a binding solution, in order to obtain a wet mass containing from 30% to 60% of water,
 a stage (b1) of drying the wet mass obtained in stage (a1) and, if desired or if necessary,
 a stage (c1) of grading the dried mass obtained in stage (b1), in order to obtain said coating composition.

According to another specific aspect, a subject matter of the present invention is a process for the preparation of the coating composition as defined above and which is provided in the form of an aqueous dispersion, comprising the following stages:
 a stage (a2) of dispersing the film-forming polymer, the whitening filler according to the invention and, if necessary or if desired, one or more other coating auxiliaries in an aqueous phase,
 a stage (b2) of grinding the mixture resulting from stage (a1), in order to form said coating composition.

According to another specific aspect, a subject matter of the present invention is a process for the preparation of the coating composition as defined above, for coating ingestible solid forms.

According to another specific aspect, a subject matter of the present invention is the use of a whitening filler devoid of titanium dioxide comprising at least one alkali metal or alkaline earth metal fatty acid salt chosen from the monovalent salts of fatty acids and alkali metal cations and/or the divalent salts of fatty acids and alkaline earth metal or other metal cations, such as calcium or magnesium cations, and at least one cellulose compound chosen from cellulose, cellulose powder, microcrystalline cellulose or a mixture of these components, in the preparation of a coating composition as defined above.

According to another specific aspect, a subject matter of the present invention is a process for the preparation of coated solid forms, characterized in that it comprises:
- a stage (a3) of dispersion of the mixture containing the film-forming polymer, the whitening filler according to the invention and, if necessary or if desired, the other coating auxiliaries in a suitable solvent, such as an aqueous medium;
- a stage (b3) of spraying the dispersion obtained in stage (a3) over solid substrates to be coated.

The ingestible solid forms coated with the coating composition which is a subject matter of the present invention can comprise nutritional agents and pharmaceutical active principles belonging to all the classes of medicines intended for oral administration.

Mention may be made, among the pharmaceutical active principles used in ingestible solid forms coated with the coating composition which is a subject matter of the present invention, of nonsteroidal anti-inflammatories and antirheumatics (ketoprofen, ibuprofen, flurbiprofen, indomethacin, phenylbutazone, allopurinol, and the like), analgesics (paracetamol, phenacetin, aspirin, and the like), antitussives (codeine, codethyline, alimemazine, and the like), sterols (hydrocortisone, cortisone, progesterone, testosterone, triamcinolone, dexamethasone, betamethasone, paramethasone, fluocinolone, beclomethasone, and the like), barbiturates (barbital, allobarbital, phenobarbital, pentobarbital, amobarbital, and the like), antimicrobials (pefloxacin, sparfloxacin, and derivatives of the class of quinolones, tetracyclines, streptogramins, metronidazole, and the like), medicines intended for the treatment of allergies, antiasthmatics, vitamins (vitamin A, vitamins B, vitamin C, vitamin E, vitamins of the D group, vitamin K), antispasmodics and antisecretory agents (omeprazole), cardiovascular agents and cerebral vasodilators (quinacainol, oxprenolol, propanolol, nicergoline, and the like), cerebroprotective agents, hepatoprotective agents, therapeutic agents for the gastrointestinal tract, vaccines, antihypertensives and cardioprotective agents, such as beta blockers and nitro derivatives.

Mention may be made, among the nutritional agents used in ingestible solid forms coated with the coating composition which is a subject matter of the present invention, of active principles generally employed in the nutritional field, such as bioactive lipids, water-soluble or water-dispersible trace element salts, water-soluble or liposoluble vitamins, prebiotics, probiotics, milk proteins and/or milk protein concentrates, plant or animal enzymes, amino acids, peptides, sugars, flavor enhancers or flavoring agents.

Mention may be made, among the bioactive lipids used in ingestible solid forms coated with the coating composition which is a subject matter of the present invention, of phytosterols, such as those extracted from vegetable oils, and more particularly extracts of sea buckthorn oil, corn oil or soybean oil; phytosterol complexes, isolated from vegetable oils, such as, for example, cholestatin, composed of campesterol, stigmasterol and brassicasterol; phytostanols; carotenoids, which belong to the family of the terpenoids, extracted from algae, green plants, fungi or bacteria; polyunsaturated fatty acids of the omega-3 group, such as, for example, α-linolenic acid, eicosapentaenoic acid or docosahexanoic acid; polyunsaturated fatty acids of the omega-6 group, such as, for example, linoleic acid, γ-linolenic acid, eicosadienoic acid, dihomo-γ-linolenic acid, arachidonic acid, docosadienoic acid, docosatetraenoic acid or docosapentaenoic acid.

Mention may be made, among the water-soluble or water-dispersible trace element salts used in ingestible solid forms coated with the coating composition which is a subject matter of the present invention, of ferrous carbonate, ferrous chloride tetrahydrate, ferric chloride hexahydrate, ferrous citrate hexahydrate, ferrous fumarate, ferrous lactate tetrahydrate, ferrous sulfate monohydrate, ferrous sulfate heptahydrate, ferrous chelate of amino acids hydrate, iron glycine chelate; calcium iodate hexahydrate, anhydrous calcium iodate; sodium iodide, potassium iodide; cobalt acetate tetrahydrate, basic cobalt carbonate monohydrate, cobalt carbonate hexahydrate, cobalt sulfate heptahydrate, cobalt sulfate monohydrate, cobalt nitrate hexahydrate; cupric acetate monohydrate, basic copper carbonate monohydrate, cupric chloride dihydrate, copper methionate, cupric sulfate pentahydrate, cuprous chelate of amino acids hydrates, cuprous chelate of glycine hydrate, copper chelate of hydroxy analogue of methionine; manganous carbonate, manganous chloride tetrahydrate, manganese hydrogen phosphate trihydrate, manganous sulfate tetrahydrate, manganous sulfate monohydrate, manganese chelate of amino acids hydrate, manganese chelate of glycine hydrate, manganese chelate of hydroxy analogue of methionine; ammonium molybdate, sodium molybdate, sodium selenite, sodium selenate; the organic form of selenium produced by *Saccharomyces cerevisiae*, selenomethionine (inactivated selenium yeast), and the selenomethionine produced by *Saccharomyces cerevisiae* (inactivated selenium yeast).

Mention may be made, among the inorganic salts used in ingestible solid forms coated with the coating composition which is a subject matter of the present invention, of the salts of metal cations, such as, for example, the sodium, potassium, calcium, magnesium, zinc, manganese, iron, copper, cobalt, silver, barium, zirconium and strontium cations, and of organic anions, such as, for example, an edible organic anion having at least one carboxylic acid functional group in the carboxylate form, chosen from the elements of the group consisting of the anions resulting from glycolic, citric, tartaric, salicylic, lactic, mandelic, ascorbic, pyruvic, fumaric, glycerophosphoric, retinoic, benzoic, kojic, malic, gluconic, galacturonic, propionic, heptanoic, 4-aminobenzoic, cinnamic, benzalmalonic, aspartic and glutamic acids.

Mention may more particularly be made, among the inorganic salts used in ingestible solid forms coated with the coating composition which is a subject matter of the present invention, of zinc gluconate, calcium gluconate, manganese gluconate, copper gluconate, magnesium aspartate, calcium aspartate, calcium glycerophosphate, calcium, magnesium glycerophosphate.

Mention may be made, among the water-soluble or fat-soluble vitamins used in ingestible solid forms coated with the coating composition which is a subject matter of the present invention, of vitamin A, more particularly in its form of retinol, retinyl acetate, retinyl palmitate or β-carotene, vitamin D2, more particularly in its form of ergocalciferol or 25-hydroxycalciferol, vitamin D3, more particularly in its form of cholecalciferol, vitamin K, more particularly in its form of phylloquinone (phytomenadione) or menaquinone, vitamin B1, more particularly in its form of thiamine hydrochloride, thiamine mononitrate, thiamine monophosphate chloride or thiamine pyrophosphate chloride, vitamin B2, more particularly in its form of riboflavin or riboflavin 5'-phosphate sodium, vitamin B6, more particularly in its form of pyridoxine hydrochloride, pyridoxine 5'-phosphate or pyridoxal 5'-phosphate, vitamin B12, more particularly in its form of cyanocobalamin, hydroxocobalamin, 5'-deoxyadenosylcobalamin or methylcobalamin, vitamin C, more particularly in its form of L-ascorbic acid, sodium L-ascorbate, calcium L-ascorbate, potassium L-ascorbate, calcium salts of 6-palmitoyl-L-ascorbic acid or sodium ascorbyl monophosphate, pantothenic acid, more particularly in its form of calcium D-pantothenate, sodium D-pantothenate, dexpanthenol or pantethine, vitamin PP, more particularly in its form of nicotinic acid, niacin, nicotinamide or inositol hexanicotinate (inositol hexaniacinate), vitamin B9, more particularly in its form of folic acid or folates, more particularly in their form of pteroylmonoglutamic acid, calcium L-methylfolate or (6S)-5-methyltetrahydrofolic acid in the form of glucosamine salt, vitamin H2, B7 or BW, more particularly in its form of biotin, choline, more particularly in its form of choline chloride, choline dihydrogen citrate or choline bitartrate, inositol, carnitine, more particularly in its form of L-carnitine or L-carnitine L-tartrate, or taurine.

Mention may be made, among the prebiotics used in ingestible solid forms coated with the coating composition which is a subject matter of the present invention, of inulin, transgalactooligosaccharides, fructans and mannooligosaccharides.

Mention may be made, among the probiotics used in ingestible solid forms coated with the coating composition which is a subject matter of the present invention, of various strains of *Saccharomyces cerevisiae*, of *Bacillus cereus* var. *toyoi*, of *Bacillus subtilis*, alone or in combination with *Bacillus licheniformis*, or also strains of *Enteroccocus faecium*.

These strains of microorganisms are generally combined with a solid support, for example calcium carbonate, dextrose or sorbitol.

Mention may be made, among the proteins and/or protein concentrates used in ingestible solid forms coated with the coating composition which is a subject matter of the present invention, of milk proteins resulting from milk cracking, such as colostrum in the form of a lyophilized or atomized powder, whey in the form of a powder, of fractions which are purified or enriched in IgG, in lactoferrin or in lactoperoxidase.

Mention may be made, among the plant or animal enzymes used in ingestible solid forms coated with the coating composition which is a subject matter of the present invention, of Promutase, superoxide dismutase (SOD), 3-phytase, 6-phytase, endo-1,4-β-glucanases, endo-1,4-β-xylanases, or also other enzymes which improve or promote digestion.

Mention may be made, among the peptides used in ingestible solid forms coated with the coating composition which is a subject matter of the present invention, of avocado peptides, lupin peptides, quinoa peptides, maca peptides, fermented or unfermented soybean peptides, rice peptides, peptides present in *Acacia macrostachya* seed extract or peptides present in passionflower seed extracts.

Mention may be made, among the amino acids used in ingestible solid forms coated with the coating composition which is a subject matter of the present invention, of alanine, arginine, asparagine, aspartic acid, cysteine, glutamic acid, glutamine, glycine, histidine, isoleucine, leucine, lysine, methionine, phenylalanine, proline, hydroxyproline, pyrrolysine, selenocysteine, serine, threonine, tryptophan, tyrosine, valine, sarcosine or ornithine.

Mention may be made, among the sugars used in ingestible solid forms coated with the coating composition which is a subject matter of the present invention, of water-soluble polysaccharides, or sugars of lower molecular weight, such as oligosaccharides or mono- or disaccharides, such as, for example, glucose, lactose or dextrose.

Mention may be made, among the flavor enhancers used in ingestible solid forms coated with the coating composition which is a subject matter of the present invention, of glutamates, such as, for example, glutamic acid, monosodium glutamate, monopotassium glutamate, calcium diglutamate, ammonium glutamate or magnesium diglutamate; guanylates, such as, for example, guanylic acid (guanosine monophosphate), disodium guanylate, dipotassium guanylate or calcium guanylate, inosinates, such as, for example, inosinic acid, disodium inosinate, dipotassium inosinate or calcium inosinate, or also intense sweeteners, such as Stevia extracts or rebaudiosides.

The expression: "the composition comprises at least 90% by volume of particles with a diameter of less than or equal to 60 micrometers" means, in the context of the present invention, that the composition is a powder of particles comparable to spheres, of which 90% by volume among them have a diameter of less than or equal to 60 micrometers. This is the measurement of the particle size characteristic Dv (90) as described below. When Dv 50 is concerned, this means that at least 50% by volume of the particles of a composition have a diameter which is less than a value.

This parameter is determined by means of a laser diffraction analyzer, for example the Malvern Mastersize™ 3000 laser particle sizer, equipped with a dispersing device, for example the dispersing device of MS1-Small Volume Sample Dispersion™ type, and connected to calculation software, which makes it possible to obtain a diffractogram consisting of a superimposition of the diffraction images of each size of particles which are represented in the powder analyzed.

In the analysis of the data thus collected, an initial size distribution is estimated and the theoretical diffractogram is calculated and then compared with the actual data recorded.

The differences between the estimated data and the actual data are subsequently minimized using the least squares method. The software subsequently calculates the volume distribution as a fundamental result and any other information is deduced from this result assuming that the particles have a spherical shape.

This method of determination is particularly well suited to the characterization of powders where the particles which constitute them are comparable to spheres with diameters of between 3000 micrometers and 0.1 micrometer, and for dry powders. The use of this type of method has particularly shown good results for particle sizes of greater than 10 micrometers [P. Bowen, "Particle Size Distribution Measurement from Millimeters to Nanometers and from Rods to Platelets"; J. Dispersion Science and Technology, 23(5), pp. 631-662 (2002)].

The term "aqueous dispersion" is understood to mean dispersions produced in water or mixtures of water and of water-soluble alcohols, such as, for example, ethanol.

Ready-for-use compositions exhibit several advantages:
the handling, the storage and the control of one and only one product,
better reproducibility of the colors and performance qualities,
easier dispersing.

In the process as defined above, for the implementation of stage (a), all of the components are added sequentially or simultaneously. The mixing is subsequently generally carried out with a powder mixer of blade mixer, tumbler mixer or "V" mixer type.

Stage (b) of the process as defined above is, for example, carried out by means of a knife mill or a pin mill or an air jet mill, so as to obtain a finely divided powder, or with a cryomilling device, generally under liquid nitrogen. Such a device makes it possible to optimize the final particle size of the coating composition.

Another subject matter of the invention is a process for the preparation of a coating composition as defined above and which is provided in the form of ready-for-use granules, comprising the following stages:

The process as defined above is, for example, described in the French patent applications published under the numbers FR 2 548 675 and FR 2 660 317 or in the Kirk-Othmer encyclopedia (3rd edition, volume 17, page 281).

The term "granules" is understood to mean mainly agglomerates of several tens to several thousands of initially individual particles of material, which can be identical or different in nature.

Stages (a1) and (b1) of the process as defined above are in particular carried out in a mixer/granulator or in a fluidized bed.

Stage (c1) of the process as defined above is in particular carried out in an oven or in a fluidized bed.

Another subject matter of the invention is a process for the preparation of a coating composition as defined above and which is provided in the form of an aqueous dispersion, comprising the following stages:

Another subject matter of the invention is the use of the coating composition as defined above for coating ingestible solid forms.

The term "ingestible solid form" is understood to mean the solid forms which can be ingested by man or animals and whatever their purpose, whether they are medicines, food supplements, cosmetic forms, confectionery or candy.

The use of the coating composition as defined above is more particularly intended for tablets.

Another subject matter of the invention is a process for coating edible solid forms, comprising:
 a stage (a3) of dispersion of the mixture containing the film-forming polymer, the whitening filler according to the invention and, if necessary or if desired, the other coating auxiliaries in a suitable solvent, such as an aqueous medium;
 a stage (b3) of spraying the dispersion obtained in stage (a3) over solid substrates to be coated.

In stage (a3) of the process as defined above, the various constituents are kept in dispersion by means of a stirrer and a deflocculating turbine mixer or a blade of "boat" type, while avoiding the formation of foam.

In stage (a3) of the process as defined above, the coating composition represents from 6% to 30% by weight, more particularly from 6% to 25% by weight and more particularly still from 6% to 20% by weight, per 100% of the weight of said dispersion.

Preparation of the Dispersions

The coating compositions are dispersed at 15% by weight in water. For each composition, 600 g of dispersion are prepared: 90 g of composition are dispersed in 450 g of purified water at 25° C. The dispersing is carried out using a laboratory stirrer of Turbotest V2004 type (sold by Rayneri) and a deflocculating turbine mixer. The rates of stirring is adjusted so as to avoid incorporating air in the dispersion, which makes it possible not to form foam. After stirring for 45 minutes, the dispersions are ready.

Film Formation

The dispersions are sprayed over placebo tablets in a perforated film-coating turbine mixer of Driacoater 500 brand sold by Driam; the charge of cores in the turbine mixer is 3 kg. The following operating conditions are followed: air flow rate=300 m$^3$/h, inlet temperature of the drying air=55° C.-60° C. The temperature of the cores varies between 36° C.-38° C. during the film-forming operation. A theoretical dry deposit of 3% is applied to the tablets.

The use of the coating composition according to the processes described above makes it possible to prepare coated pharmaceutical, veterinary or food supplement tablets. The following examples illustrate the invention without, however, limiting it.

DESCRIPTION OF THE PREFERRED EMBODIMENTS

Examples

The qualifying of the film-coating compositions as described above as alternatives to compositions containing titanium dioxide, exhibiting in particular satisfactory characteristics of white and opacifying coloring, is established by the implementation of analyses as described below.

Tablets are film-coated with the film-coating compositions to be evaluated.

The film-coated tablets are studied according to the combination of the two following methods:

1. Visual Method

The visual quality of the film coatings on the tablets is evaluated under standardized conditions of exposure to daylight or by means of a Konica Minolta Just Normlicht light cabin; at least two evaluators are required. The three parameters studied are:
 the smooth nature of the surface film of tablets; graded from 1 to 4 (1: Smooth-2: Bumps-3: Granular-4: Very granular); the best result being to obtain a smooth surface film; only a grade of 1 will be considered satisfactory,
 the coverage over the surface of the tablets; graded from 1 to 3; the best result being notified by a grade of 3; only the grades 2 and 3 will be considered satisfactory,
 as well as the coverage of the edges; graded from 1 to 4; the best result being notified by a grade of 4; only the grades of 3 and 4 will be considered satisfactory.

2. Colorimetric Method, Chroma Meter

The L*a*b* color space, defined by the CIE in 1976 and also called CIELAB space, is currently one of the most widely used to measure the color of objects in different fields of activity. It covers the entire spectrum visible to the human eye and represents it in a uniform way. It thus makes it possible to describe all the visible colors.

In this, a color is pinpointed by three values:
 L*, lightness (0 for black to 100 for white),
 a* and b*, the chromaticity coordinates, ranging from green to red and from blue to yellow respectively with values ranging from −120 to +120.

Use is made here of the Konica Minolta CR-400 colorimeter/chroma meter in order to acquire the color on the tablets film-coated with coating solution(s).

Two criteria in particular are studied:
 lightness L*, since we are in shades of white—this measurement will make it possible to measure the impact of the film coating on the final color of the tablets and thus to differentiate the impact of the different ingredients+=only L* values of greater than or equal to 90 will be considered satisfactory, also, the numerical calculation of the ΔE, which makes possible a complete analysis of possible differences between a reference (for example a reference here with regard to titanium dioxide) and the tablet studied, by taking into account this time the L*, a* and b* parameters. The calculation formula is as follows: $\Delta E = \sqrt{[(L1-L2)^2+(a1-a2)^2+(b1-b2)^2]} \Leftrightarrow$ it is considered that a difference $\Delta E \leq 5$ is not visible to the human eye; in other words, a film-coated tablet exhibiting a value $\Delta E > 5$ will be regarded as different from the reference taken into consideration—the formulation which has been used to film-coat it will thus be regarded as unsatisfactory.

It is the combining into a whole of the conclusions obtained with regard to these two methods which determines the ability of the new film-coating products to pertinently be an alternative to the film coatings containing titanium dioxide.

Example 1

Film-coating products are formulated in the powder form according to the following composition (not exhaustive):

| Formulation | F1 | F2 | F3 | F4 | F14 |
|---|---|---|---|---|---|
| HPMC (hydroxypropyl methylcellulose) | 60% | 60% | 60% | 60% | 60% |
| Whitening filler*: | | | | | |
| Magnesium stearate | 20% | 20% | 20% | 20% | 0% |
| Calcium stearate | 0% | 0% | 0% | 0% | 20% |
| MCC (microcrystalline cellulose) | 20% | 0% | 0% | 0% | 20% |
| Cellulose powder | 0% | 20% | 0% | 0% | 0% |
| Calcium carbonate | 0% | 0% | 20% | 0% | 0% |
| Talc | 0% | 0% | 0% | 20% | 0% |

*The various compounds tested exhibit a particle size profile, established by laser particle sizing, in accordance with the interval described above in the description of the invention. The % are by weight (for example, the Dv(90) of the microcrystalline cellulose used in the preparation of the formulations F1 to F4, as defined above, is less than or equal to 50 micrometers.

500 mg placebo tablets with the following composition: 49.8% of microcrystalline cellulose, 49.6% of lactose and 0.6% of magnesium stearate, are film-coated with the various film-forming compositions. Some of these tablets are pre-film-coated with a Sepifilm PW Yellow I film-coating solution, inducing a yellow/orange coloring at the surface of the cores, in order to more precisely visualize the covering abilities, in particular of the various film-forming compositions to be tested.

The film coatings are carried out in a Profile Automation perforated turbine mixer charged with 1.2 kg of tablets; the dry deposit on the tablets is 5%.

Tablets film-coated with the commercial product Sepifilm PW White containing titanium dioxide are taken as reference.

The film-coated tablets are studied according to a combination of the following two methods:

1. using the visual method described above, 2. using the colorimeter/chroma meter as described above.

The following results are obtained:
1. Evaluation according to the visual method:

| | Smooth character of the film (1: Smooth - 2: Bumps - 3: Granular - 4: Very granular) | Surface coverage (− to +; scale 1 to 3) | Coverage of the edges (− to +; scale 1 to 4) |
|---|---|---|---|
| Film-coating formulation F1 | 1 | 3 | 4 |
| Film-coating formulation F2 | 1 | 3 | 3 |
| Film-coating formulation F3 | 1 | 3 | 2 |
| Film-coating formulation F4 | 1 | 3 | 3 |
| Film-coating formulation F14 | 1 | 3 | 3 |

2. Colorimetric evaluation with regard to the advantageous formulations:

| | Value of L* on tablets not film-coated beforehand | ΔE* on tablets not film-coated beforehand | Value of L* on tablets film-coated beforehand with Sepifilm PW Yellow I |
|---|---|---|---|
| Film-coating formulation F1 | 97 | 4 | 90 |
| Film-coating formulation F2 | 97 | 4 | 90 |
| Film-coating formulation F4 | 96 | 4 | 88 |
| Reference with titanium dioxide* | 96 | Reference | 94 |

*This reference is a commercial product containing an identical proportion and identical nature of film-forming compound (HPMC), a proportion of whitening filler of the same order, with in particular the implementation of 20% of titanium dioxide.

Interpretation:

The superior performance of the formulations based on microcrystalline cellulose or cellulose powder is thus noticed. Talc is also advantageous on the scale of the first evaluation method but has fallen regarding the evaluation by colorimetry.

The colorimetry of these tests on cellulose compounds confirms the relevance of these compositions as a replacement for titanium dioxide.

Example 2

We wished to confirm the specificity of the (quantitative) synergy between the alkali metal or alkaline earth metal fatty acid compounds and the cellulose compounds (the two components of the whitening filler according to the invention). Various film-forming compositions containing, for whitening filler, the microcrystalline cellulose and magnesium stearate combination were prepared:

| Formulation | F5 | F6 | F7 | F8 | F9 | F11 | F12 | F13 |
|---|---|---|---|---|---|---|---|---|
| HPMC (hydroxypropyl methylcellulose) | 60% | 60% | 60% | 60% | 60% | 40% | 0% | 0% |
| Starch (PC-10 starch) | 0% | 0% | 0% | 0% | 0% | 0% | 60% | 0% |
| HPC (hydroxypropyl cellulose) | 0% | 0% | 0% | 0% | 0% | 0% | 0% | 60% |

-continued

| Formulation | F5 | F6 | F7 | F8 | F9 | F11 | F12 | F13 |
|---|---|---|---|---|---|---|---|---|
| Whitening filler: | | | | | | | | |
| MCC (microcrystalline cellulose) | 40% | 30% | 20% | 10% | 0% | 30% | 20% | 20% |
| Magnesium stearate | 0% | 10% | 20% | 30% | 40% | 30% | 20% | 20% |

Placebo tablets identical to those used in example 1 are employed. Some are film-coated beforehand with a Sepifilm PW Yellow I film-coating solution, inducing a yellow/orange coloring at the surface of the cores.

The film coatings are carried out in the Profile Automation perforated turbine mixer; the dry deposit on the tablets is 5%.

The film-coated tablets are studied using the visual method described above.

The following results are obtained:
1. Evaluation according to the visual method:

| | Smooth character of the film (1: Smooth - 2: Bumps - 3: Granular - 4: Very granular) | Surface coverage (– to +; scale 1 to 3) | Coverage of the edges (– to +; scale 1 to 4) |
|---|---|---|---|
| Film-coating formulation F5 | 1 | 1 | 1 |
| Film-coating formulation F6 | 1 | 2 | 4 |
| Film-coating formulation F7 | 1 | 3 | 4 |
| Film-coating formulation F8 | 1 | 2 | 3 |
| Film-coating formulation F9 | 1 | 2 | 2 |
| Film-coating formulation F11 | 1 | 3 | 2 |
| Film-coating formulation F12 | 2 | 1 | 1 |
| Film-coating formulation F13 | 1 | 2 | 3 |

Interpretation:

The superior performance of the formulations F6, F7, F8 and F13, with respect to the formulations F5, F9, F11 and F12, is thus noticed.

Example 3

We wished to study the specificity of the particle size profile of the powders constituting the whitening filler.

Two film-forming compositions containing, for whitening filler, the microcrystalline cellulose and magnesium stearate combination were prepared:

| Formulation | FI | FJ |
|---|---|---|
| HPMC (hydroxypropyl methylcellulose) | 60% | 60% |
| Whitening filler: | | |
| MCC (microcrystalline cellulose) | 20% (fine particle size profile) | 20% (coarse particle size profile) |
| Magnesium stearate | 20% | 20% |

The particle size profile of the powders is measured by virtue of a Mastersizer 3000 laser particle sizer from Malvern, used in the dry route, at a pressure of 1 bar.

The particle size profiles of the microcrystalline celluloses studied are as follows:

$MCC > d(v,50) = 10\text{-}20 \ \mu m, d(v,90) = 40\text{-}60 \ \mu m.$     Formulation I:

$MCC > d(v,50) = 100\text{-}120 \ \mu m, d(v,90) = 220\text{-}250 \ \mu m.$     Formulation J:

Placebo tablets identical to those used in example 1 are employed. Some are film-coated beforehand with a Sepifilm PW Yellow I film-coating solution, inducing a yellow/orange coloring at the surface of the cores.

The film coatings are carried out in the Profile Automation perforated turbine mixer; the dry deposit on the tablets is 5%.

The visual method alone, described above, makes it possible to decide on the quality/relevance of the film-coating composition.

The following results are obtained:

| | Smooth character of the film (1: Smooth - 2: Bumps - 3: Granular - 4: Very granular) | Surface coverage (– to +; scale 1 to 3) | Coverage of the edges (– to +; scale 1 to 4) |
|---|---|---|---|
| Film-coating formulation I | 1 | 3 | 4 |
| Film-coating formulation J | 4 | 2 | 2 |

Interpretation:

The importance of the choice of particle size profiles of the whitening filler on the performance of the film-coating composition is thus noticed, the formulation J being straight away considered unsatisfactory according to the visual evaluation method.

The invention claimed is:

1. A coating composition comprising, per 100% of its weight:
   from 40% to 60% by weight of a film-forming polymer, said film-forming polymer being hydroxypropyl methylcellulose (HPMC),
   from 0% to 20% by weight of at least one auxiliary coating agent chosen from diluents, surfactants, plasticizers or antifoaming agents, and
   from 20% to 40% by weight of a whitening filler devoid of titanium dioxide comprising at least one alkali metal or alkaline earth metal fatty acid salt chosen from the magnesium salt of stearic acid and the calcium salt of stearic acid and at least one cellulose compound chosen from cellulose, cellulose powder, microcrystalline cellulose or a mixture of these components;
   wherein at least 90% by volume of the particles of said at least one cellulose compound have a diameter of 40 to 60 micrometers;
   wherein said HPMC is present in a greater amount by weight than said whitening filler devoid of titanium dioxide;
   wherein the whitening filler is composed, per 100% of weight, of 25% to 75% by weight of said alkali metal or alkaline earth metal fatty acid salt and of 25% to 75% by weight of said cellulose compound; and wherein said coating composition is in the form of mixtures of powders or of granules.

2. The coating composition as claimed in claim 1, wherein said at least one auxiliary coating agent is chosen from diluents; or antifoaming agents.

3. The coating composition as claimed in claim 1, wherein the alkali metal or alkaline earth metal fatty acid salt is magnesium stearate.

4. A process for the preparation of the coating composition as defined in claim 1 and which is provided in the form of a dry powder, comprising the following stages:
- a stage (a) of mixing the film-forming polymer, the whitening filler and, if necessary or if desired, one or more other coating auxiliaries,
- a stage (b) of grinding the mixture resulting from stage (a), in order to form said coating composition.

5. A process for the preparation of a coating composition as defined in claim 1 and which is provided in the form of ready-for-use granules, comprising the following stages:
- a stage (a1) of wetting the mixture of film-forming polymer, of the whitening filler and, if necessary or if desired, of one or more other coating auxiliaries with a binding solution, in order to obtain a wet mass containing from 30% to 60% of water,
- a stage (b1) of drying the wet mass obtained in stage (a1) and, if desired or if necessary,
- a stage (c1) of grading the dried mass obtained in stage (b1), in order to obtain said coating composition.

6. A process for the preparation of the coating composition as defined in claim 1 and which is provided in the form of an aqueous dispersion, comprising the following stages:
- a stage (a2) of dispersing the film-forming polymer, the whitening filler and, if necessary or if desired, one or more other coating auxiliaries in an aqueous phase,
- a stage (b2) of grinding the mixture resulting from stage (a1), in order to form said coating composition.

7. An ingestible solid form having a coating comprising the coating composition as defined in claim 1.

8. The coating composition as defined in claim 1, wherein a weight ratio of HPMC to the whitening filler devoid of titanium dioxide is 3:2.

9. A coating composition comprising, per 100% of its weight:
- from 40% to 60% by weight of a film-forming polymer, said film-forming polymer being hydroxypropyl methylcellulose (HPMC),
- from 0% to 20% by weight of at least one auxiliary coating agent chosen from diluents, surfactants, plasticizers or antifoaming agents, and
- from 20% to 40% by weight of a whitening filler devoid of titanium dioxide comprising at least one alkali metal or alkaline earth metal fatty acid salt chosen from the magnesium salt of stearic acid and the calcium salt of stearic acid and at least one cellulose compound chosen from cellulose, cellulose powder, microcrystalline cellulose or a mixture of these components;
- wherein said HPMC is present in a greater amount by weight than said whitening filler devoid of titanium dioxide;
- wherein the whitening filler is composed, per 100% of weight, of 25% to 75% by weight of said alkali metal or alkaline earth metal fatty acid salt and of 25% to 75% by weight of said cellulose compound;
- wherein said coating composition is in the form of mixtures of powders or of granules; and
- wherein said composition, when dispersed in water and sprayed on previously uncoated tablets, yields measured L* values of the CIELAB color space of 96 or 97.

10. The coating composition as claimed in claim 9, wherein said at least one auxiliary coating agent is chosen from diluents; or antifoaming agents.

11. The coating composition as claimed in claim 9, wherein the alkali metal or alkaline earth metal fatty acid salt is magnesium stearate.

12. The coating composition as defined in claim 9, wherein a weight ratio of HPMC to the whitening filler devoid of titanium dioxide is 3:2.

* * * * *